United States Patent
Cho et al.

(10) Patent No.: US 12,492,870 B2
(45) Date of Patent: Dec. 9, 2025

(54) PLATE-TYPE HEAT EXCHANGER INLINE FILTER

(71) Applicant: YKMC, Inc., Asan-si (KR)

(72) Inventors: Sung Youl Cho, Asan-si (KR); Ki Bum Jang, Seoul (KR)

(73) Assignee: YKMC, INC., Asan-si (KR)

( * ) Notice: Subject to any disclaimer, the term of this patent is extended or adjusted under 35 U.S.C. 154(b) by 0 days.

(21) Appl. No.: 18/563,377

(22) PCT Filed: Sep. 15, 2023

(86) PCT No.: PCT/KR2023/013925
§ 371 (c)(1),
(2) Date: Nov. 22, 2023

(87) PCT Pub. No.: WO2024/071772
PCT Pub. Date: Apr. 4, 2024

(65) Prior Publication Data
US 2025/0075990 A1   Mar. 6, 2025

(30) Foreign Application Priority Data
Sep. 29, 2022 (KR) .......................... 10-2022-0124312

(51) Int. Cl.
*F28F 19/01*   (2006.01)
*F28F 19/02*   (2006.01)

(52) U.S. Cl.
CPC .............. *F28F 19/01* (2013.01); *F28F 19/02* (2013.01); *F28F 2245/00* (2013.01)

(58) Field of Classification Search
None
See application file for complete search history.

(56) References Cited

U.S. PATENT DOCUMENTS 3,690,373 A * 9/1972 Wright .................... F28F 3/083
165/119
11,964,222 B2 * 4/2024 Blomqvist .............. F28F 19/01

FOREIGN PATENT DOCUMENTS

| CN | 209783355 U | 12/2019 |
| EP | 3669962 A1 | 6/2020 |
| JP | 2779548 B2 | 7/1998 |

(Continued)

OTHER PUBLICATIONS

KR100992097B1 English Machine Translation (Year: 2010).*

(Continued)

*Primary Examiner* — Jenna M Maroney
(74) *Attorney, Agent, or Firm* — You & IP, LLC

(57) ABSTRACT

A plate-type heat exchanger inline filter comprises a filtration filter which is inserted into a cooling fluid inlet of a plate-type heat exchanger formed by a plurality of heat transfer plates and filters dust or foreign matter contained in the fluid. The filtration filter includes a filter pipe which has a hollow shape and in which an input hole communicating with the cooling fluid inlet is formed in one surface thereof and a plurality of small-diameter holes are formed to pass through an outer surface thereof to allow the fluid to pass therethrough in a direction perpendicular to the cooling fluid inlet toward a gap between the heat transfer plates and reinforcement member closely fixed along an inner circumferential surface of the filter pipe to support the inner circumferential surface of the filter pipe.

7 Claims, 4 Drawing Sheets

(56) References Cited

FOREIGN PATENT DOCUMENTS

| KR | 10-0988217 | B1 | | 10/2010 | | |
|----|------------|----|----|---------|----|----|
| KR | 10-0992097 | B1 | | 11/2010 | | |
| WO | WO-2010071907 | A1 | * | 7/2010 | ......... | B01D 46/0049 |

OTHER PUBLICATIONS

WO2010071907A1 English Machine Translation (Year: 2010).*
"Davis, J.R . . . (1999). Corrosion of Aluminum and Aluminum Alloys—2 Understanding the Corrosion Behavior of Aluminum. (pp. 25-43). ASM International. Retrieved from https://app.knovel.com/hotlink/pdf/id:kt010W6A32/corrosion-aluminum-aluminum/passivity-aluminum-aluminum" (Year: 1999).*

* cited by examiner

PLATE-TYPE HEAT EXCHANGER INLINE FILTER

TECHNICAL FIELD

The present invention relates to an inline filter, and more specifically, to a plate-type heat exchanger inline filter in which a reinforcement member reinforces a filtration filter by being formed on an inner circumferential surface of the filtration filter, through which a fluid passes through, so as to prevent deformation of the filtration filter due to a pressure of the fluid.

BACKGROUND ART

In general, a plate-type heat exchanger is an apparatus in which a plurality of metal plates, which are formed in consideration of a type and a flow of a fluid and a structural strength of a product, overlap and allow a heating fluid and a heat receiving fluid to alternately flow in layers between the metal plates to exchange heat between the fluids flowing between the metal plates.

In this case, examples of the heating fluid include high-temperature fluids, such as steam, a lubricant, etc., and examples of the heat receiving fluid include low-temperature fluids, such as a fluid, seawater, a refrigerant, etc., of which temperature is lower than that of the high-temperature fluid.

That is, in a structure in which two types of fluids having different temperatures are separated by an interlayer flow path between the metal plates and flow as a counter flow or a parallel flow, heat is exchanged while the high-temperature fluid and the low-temperature fluid cross each other layer by layer.

In this case, since the plate-type heat exchanger has a small size, a light weight, and high efficiency, the plate-type heat exchanger is widely used as a cooling or heating apparatus for various boiler apparatuses, surface treatment apparatuses, wastewater treatment apparatuses, dyeing apparatuses, power plants, ships, incinerators, and the like.

Referring to Patent Document 1 (KR 10-0988217 B1) related to the conventional inline filter for a plate-type heat exchanger, which includes a main body, which is rolled in a roll type so that adjacent surfaces formed on both ends thereof are close to each other to form an inner space allowing a fluid to flow therein and of which an outer surface is provided with perforated holes for discharging the fluid, and an elastic member fixedly fastened to the adjacent surfaces of the main body to maintain a state in which the adjacent surfaces are close to each other.

In this case, a plurality of slots are formed in the adjacent surfaces of the main body to be spaced a predetermined distance from each other, and fixing protrusions formed on an outer surface of the elastic member is inserted into and coupled to the slots to maintain the state in which the adjacent surfaces are positioned close to each other by the elastic member.

That is, the above-described inline filter is inserted into and coupled to a cooling fluid inlet of the plate-type heat exchanger to seal one side of the cooling fluid inlet, and when the fluid is supplied through an entrance at the other side, the fluid flows into the inner space of the main body, then is discharged through the perforated holes in a direction perpendicular to a supply direction of the fluid, and is supplied into a gap between heat transfer plates.

However, in Patent Document 1, there are problems that, when the operating fluid is supplied to an uppermost floor of a skyscraper or super skyscraper, a pressure of the fluid passing through the heat exchanger increases. In the case of a general type (or conventional) inline filter, the outer surface of the main body expands to change a shape thereof, and in addition, when the supply of the circulating operating fluid is stopped due to an unexpected situation, the inside of the main body is changed to a vacuum state by a reverse pressure due to the fluid instantaneously discharged downward to decrease an internal pressure and contractively deform the outer surface of the main body, and the outer surface of the main body is fitted into the fluid inlet due to the deformation of the outer surface of the main body to cause a difficulty in separating the main body installed in the fluid inlet to the outside. Since the outer surface of the main body is deformed, a diameter of each of perforated holes of the main body allowing the fluid to pass through is also changed, dust or foreign matter passes through the perforated holes without being filtered when the diameter increases, and a pressure loss increases to reduce heat transfer efficiency and degrade the reliability of the plate-type heat exchanger when the diameter decreases.

DISCLOSURE

Technical Problem

Accordingly, the present invention is directed to providing a plate-type heat exchanger inline filter in which a filter pipe of a filtration filter is inserted into and coupled to a filtering path of a plate-type heat exchanger, a reinforcement member is installed along an inner circumferential surface of the filter pipe, and thus, when a fluid is supplied through a fluid inlet of the plate-type heat exchanger, dust or foreign matter contained in the fluid is filtered while the fluid being introduced through the fluid inlet is supplied into the filter pipe through an input hole of the filter pipe and flows toward a gap between heat transfer plates through a small-diameter hole, and deformation of an outer surface of the filter pipe due to a pressure of the fluid flowing into the filter pipe or a pressure of the fluid passing through the small-diameter hole is prevented by firmly supporting the inner circumferential surface of the filter pipe.

Technical Solution

One aspect of the present invention provides a plate-type heat exchanger inline filter including a filtration filter which is inserted into a cooling fluid inlet of a plate-type heat exchanger formed by a plurality of heat transfer plates that are stacked and coupled, receives a fluid through one surface thereof communicating with the cooling fluid inlet, and filters dust or foreign matter contained in the fluid while the fluid passes through an outer surface thereof to be supplied between the heat transfer plates and a stopper part fitted to the other end of the filtration filter to seal the other end of the cooling fluid inlet, wherein the filtration filter includes a filter pipe which has a hollow shape and in which an input hole communicating with the cooling fluid inlet is formed in one surface thereof and a plurality of small-diameter holes are formed to pass through an outer surface thereof to allow the fluid to pass therethrough in a direction perpendicular to the cooling fluid inlet toward a gap between the heat transfer plates and reinforcement member closely fixed along an inner circumferential surface of the filter pipe to support the inner circumferential surface of the filter pipe.

The filtration filter may be formed of an aluminum material, inner and outer circumferential surfaces of the filtration filter may be surface-treated by an anodizing method and a sealing method, or the inner and outer circumferential surfaces are surface-treated by an anodizing method and a sealing method, and anti-scale coating is performed thereon, and the filtration filter may induce the dust or foreign matter to slide to prevent the dust or foreign matter from being adsorbed on the inner circumferential surface of the filtration filter.

The anodizing method of performing a surface treatment on the filtration filter may include one of a sulfuric acid method, an oxalic acid method, a phosphoric acid method, and a chromic acid method.

Through the sulfuric acid method of performing a surface treatment on the filtration filter, a phosphorus oxide film may be formed to perform a surface treatment on the inner and outer circumferential surfaces of the filtration filter.

The sealing method of performing a surface treatment on the filtration filter may include one of a hydration sealing method, a metal-salt sealing method, and an organic sealing method.

The hydration sealing method or metal-salt sealing method of performing a surface treatment on the filtration filter may be performed using a surfactant to provide a hydrophobic property to perform a surface treatment on the inner and outer circumferential surfaces of the filtration filter.

The anti-scale coating performed on the filtration filter may be performed with a mixture containing Teflon™, silicone resin, and sodium lauryl sulfate, and the mixture may be sprayed on the inner and outer circumferential surfaces of the filtration filter in a spray manner.

A curved guide part, which is formed to be curved along an inner circumferential surface of the input hole toward the inner circumferential surface of the filter pipe to guide the fluid being introduced through the cooling fluid inlet to be collected in and supplied into the filter pipe, may be further formed in the input hole of the filter pipe.

A diameter of the small-diameter hole of the filter pipe may be proportional to a width of a channel between the heat transfer plates of the plate-type heat exchanger or may be relatively smaller than the width of the channel between the heat transfer plates, and the fluid may be supplied between the heat transfer plates.

The reinforcement member may be formed to extend as a single structure in a spiral shape formed along the inner circumferential surface of the filter pipe.

The reinforcement member may be provided as a plurality of reinforcement members in a spiral shape intermittently formed along the inner circumferential surface of the filter pipe and coupled and connected to each other.

The reinforcement member may be provided as a plurality of reinforcement members having ring shapes to be spaced a predetermined interval from each other in a longitudinal direction of the filter pipe and fixed to the inner circumferential surface of the filter pipe by a welding method.

A cross section of the reinforcement member may be formed in any one shape among a circular shape, a semicircular shape, an oval shape, and a polygonal shape.

A pair of handles may be symmetrically formed on an inner circumferential surface of the other end of the filter pipe, and tool catching grooves, which are formed in an outer circumferential surface of the filter pipe to be spaced a predetermined interval from each other in a linear direction to catch a tool, may be further formed in the filter pipe.

Advantageous Effects

According to the present invention, since a reinforcement member is installed along an inner circumferential surface of a filter pipe of a filtration filter, a shape of an outer surface the filter pipe is maintained by the reinforcement member without changing. The reinforcement member firmly supports the inner circumferential surface of the filter pipe to prevent the outer surface of the filter pipe from expanding or contracting due a pressure of a fluid flowing in the filter pipe. Since a diameter of a small-diameter hole is not changed because the outer surface of the filter pipe is prevented from being deformed, dust or foreign matter is prevented from passing through the small-diameter hole without being filtered. In addition, the same amount of fluid can pass through a cooling fluid inlet of the plate-type heat exchanger through the small-diameter hole. As the shape of the outer surface of the filter pipe is maintained by the reinforcement member, a dust or foreign matter filtering function and the same amount of flowing fluid can be maintained. As expansion of the filter pipe of the filtration filter is prevented, the filter pipe can be easily separated from the inside of the cooling fluid inlet. Accordingly, there are advantages that the maintenance is convenient, and the reliability of a product is also improved.

MODES OF THE INVENTION

Hereinafter, embodiments of the present invention will be described in more detail with reference to the accompanying drawings.

Figure 1:
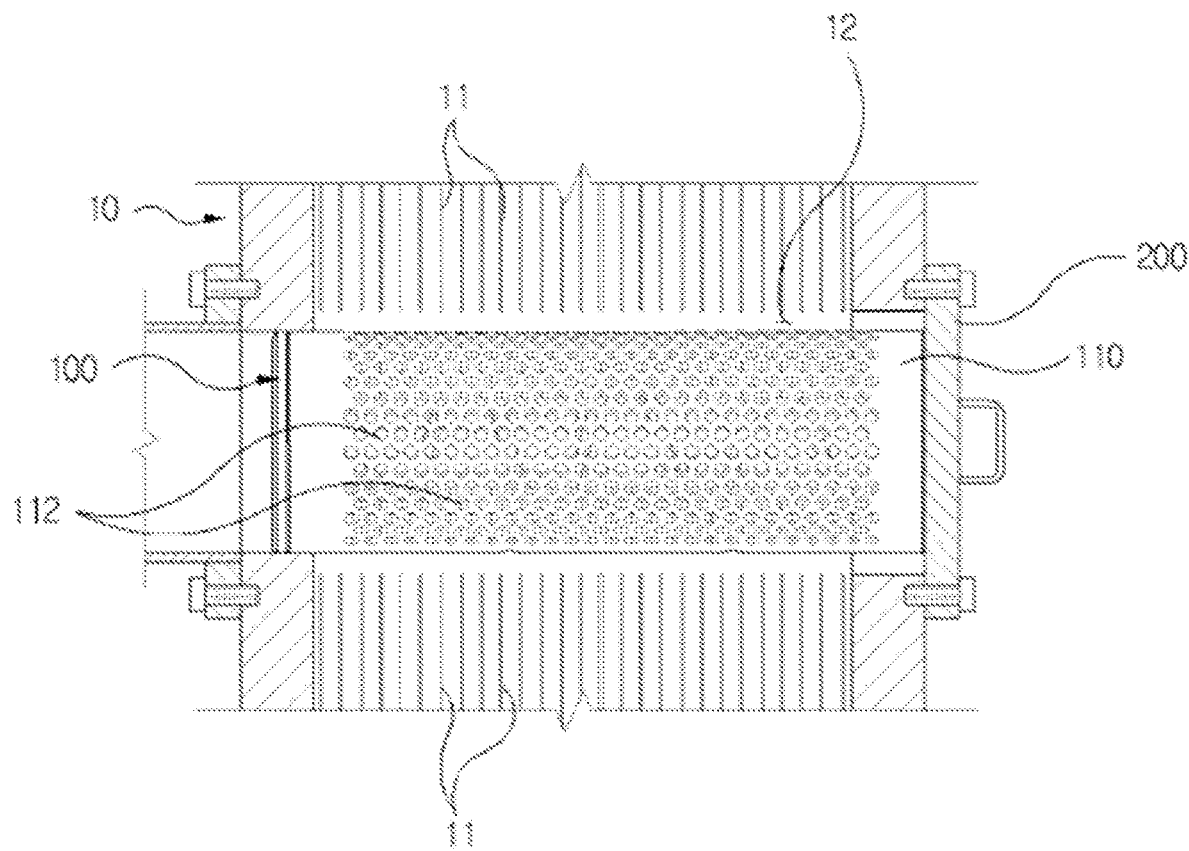
FIG. 1 is a schematic cross-sectional view illustrating a plate-type heat exchanger inline filter according to the present invention.
Figure 2:
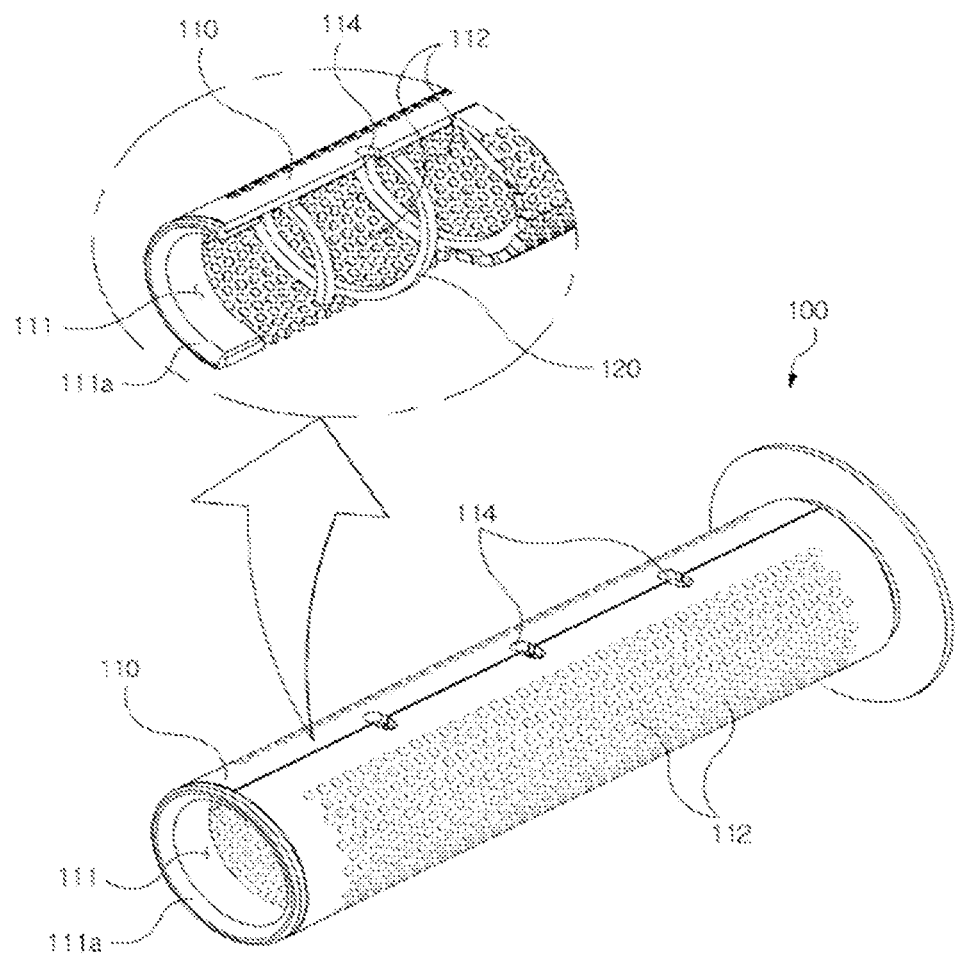
FIG. 2 is a perspective view illustrating the plate-type heat exchanger inline filter according to the present invention.
Figure 3:
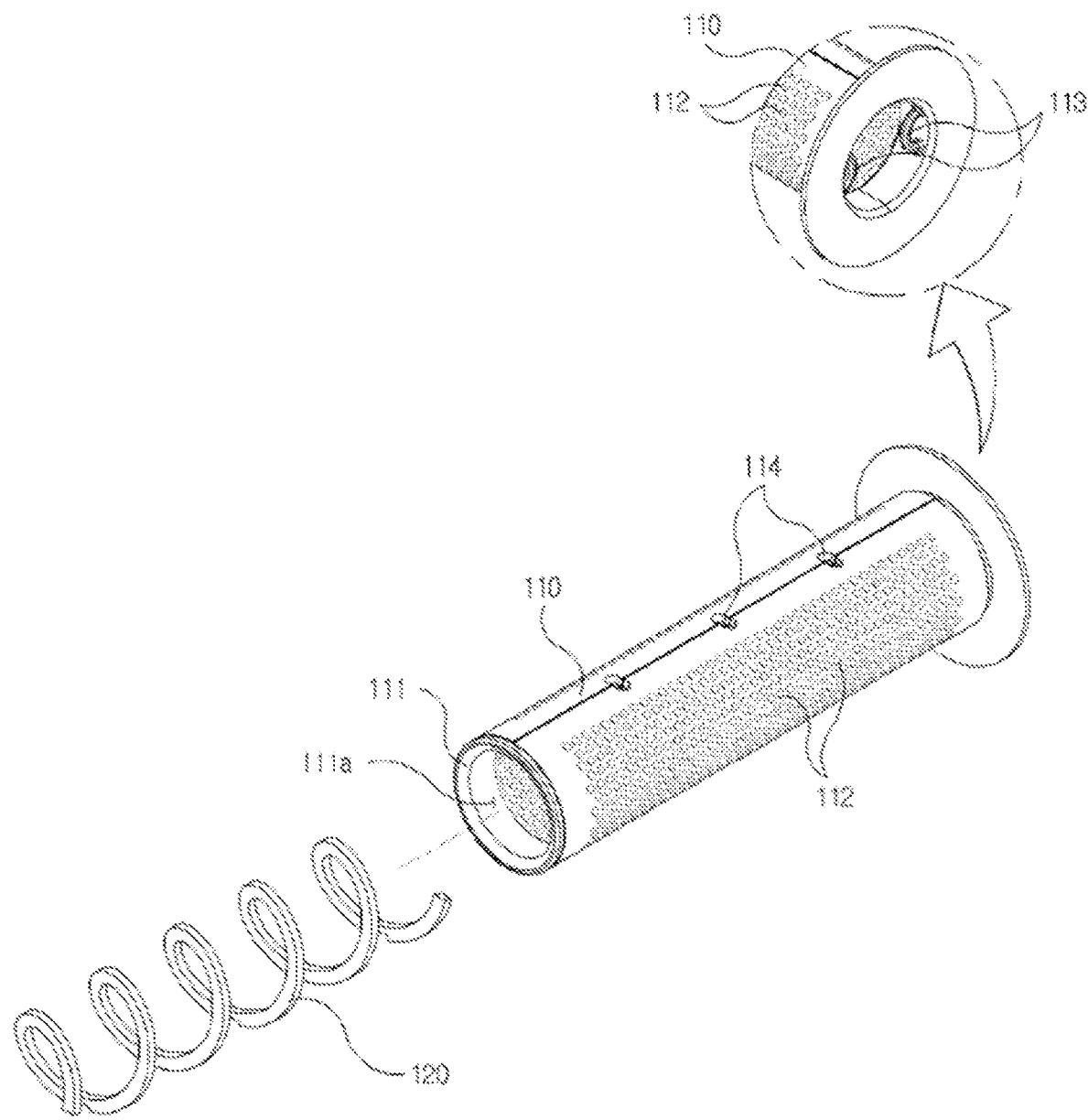
FIG. 3 is an exploded perspective view of FIG. 2.
Figure 4:
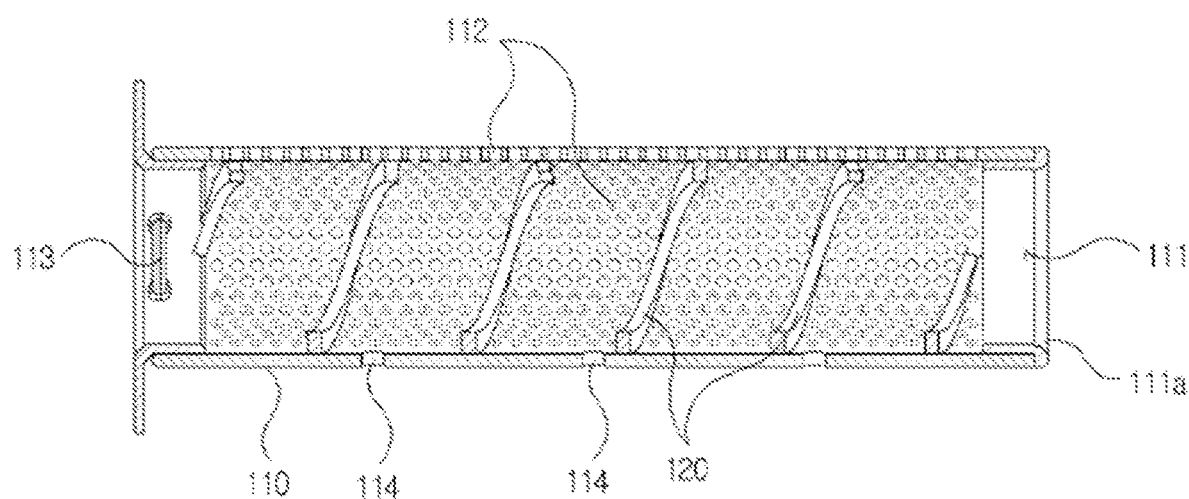
FIG. 4 is a side cross-sectional view illustrating the plate-type heat exchanger inline filter according to the present invention.

Referring to FIGS. 1 to 4, a filtration filter 100 is inserted into a cooling fluid inlet 12 of a plate-type heat exchanger 10 formed by a plurality of heat transfer plates 11 that are stacked and coupled, receives a fluid through one surface of the filtration filter 100 communicating with the cooling fluid inlet 12, and filters dust or foreign matter contained in the fluid while the fluid passes through an outer surface of the filtration filter to be supplied between the heat transfer plates 11.

The filtration filter 100 filters the dust or foreign matter contained in the fluid flowing from the cooling fluid inlet 12 of the plate-type heat exchanger 10 toward the heat transfer plates 11.

The filtration filter 100 is formed in a hollow cylindrical shape and allows the fluid being introduced through the cooling fluid inlet 12 to pass therethrough.

The filtration filter 100 is formed of an aluminum material, and inner and outer circumferential surfaces of the filtration filter 100 are surface-treated by an anodizing method and a sealing method, or the inner and outer circumferential surfaces are surface-treated by an anodizing method and a sealing method and then anti-scale coated. The filtration filter 100 induces the dust or foreign matter to slide to prevent the dust or foreign matter from being adsorbed on the inner circumferential surface.

An anti-scale coating method performed on the filtration filter 100 prevents the flow of the fluid from interfering with by the dust or foreign matter contained in the fluid that is stuck on the filtration filter 100.

The anodizing method of performing a surface treatment on the filtration filter 100 includes a sulfuric acid method, an oxalic acid method, a phosphoric acid method, or a chromic acid method.

The filtration filter 100 is surface-treated by one among a sulfuric acid method, an oxalic acid method, a phosphoric acid method, and a chromic acid method and is suitable to be surface-treated by the sulfuric acid method.

Through the sulfuric acid method of performing a surface treatment on the filtration filter 100, a phosphorus oxide film is formed to have a thickness of the 50±5 µm to perform a surface treatment on the inner and outer circumferential surfaces of the filtration filter.

The sealing method of performing a surface treatment on the filtration filter 100 includes a hydration sealing method, a metal-salt sealing method, and an organic sealing method.

The hydration sealing method or metal-salt sealing method of performing a surface treatment on the filtration filter 100 is performed using a surfactant to provide a hydrophobic property to perform a surface treatment on the inner and outer circumferential surfaces of the filtration filter.

The anti-scale coating performed on the filtration filter 100 is performed with a mixture containing Teflon™, silicone resin, and sodium lauryl sulfate, and the mixture is sprayed on the inner and outer circumferential surfaces of the filtration filter in a spray manner so that a coating thickness is in the range of 10 to 40 µm.

The filtration filter 100 includes a filter pipe 110 which has a hollow shape and in which an input hole 111 communicating with the cooling fluid inlet 12 is formed in one surface and a plurality of small-diameter holes 112 are formed to pass through an outer surface to allow the fluid to pass therethrough in a direction perpendicular to the cooling fluid inlet 12 toward a gap between the heat transfer plates 11 and reinforcement members 120 closely fixed along an inner circumferential surface of the filter pipe 110 to support the inner circumferential surface of the filter pipe 110.

The filter pipe 110 receives the fluid through the input hole 111 and guides the fluid to be discharged through the small-diameter holes 112 in the direction between the heat transfer plates 11 so that the dust or foreign matter contained in the fluid is filtered by the inner circumferential surface.

A diameter of each of the small-diameter holes 112 of the filter pipe 110 is proportional to a width of a channel between the heat transfer plates 11 of the plate-type heat exchanger 10 or is relatively smaller than the width of the channel between the heat transfer plates 11, and the fluid is supplied between the heat transfer plates 11.

The width of the channel between the heat transfer plate 11 may be adjusted in an assembly process of the plate-type heat exchanger 10.

The input hole 111 of the filter pipe 110 communicates with the cooling fluid inlet 12 of the plate-type heat exchanger 10 to allow the fluid being introduced through the cooling fluid inlet 12 to be supplied into the filter pipe 110.

The filter pipe 110 may be formed as a mesh structure in which a plurality of small-diameter holes 112 are formed in an outer surface of the filter pipe 110.

A curved guide part 111a, which is formed to be curved along an inner circumferential surface of the input hole 111 toward the inner circumferential surface of the filter pipe 110 to guide the fluid being introduced through the cooling fluid inlet 12 to be collected in and supplied into the filter pipe 110, is further formed in the input hole 111 of the filter pipe 110.

The curved guide part 111a guides the supply of the fluid so that the fluid around the input hole 111 is guided to flow into the input hole 111.

A curvature value of the curved guide part 111a may be adjusted by a user.

A pair of handles 113 are symmetrically formed on an inner circumferential surface of the other end of the filter pipe 110, and tool catching grooves 114 spaced a predetermined interval from each other in a linear direction to catch a tool are further formed in an outer circumferential surface of the filter pipe 110.

The handles 113 are gripped by the user and allow the filter pipe 110 to be separated from the inside of the cooling fluid inlet 12 of the plate-type heat exchanger 10 by a tensile force of the user.

Each of the handles 113 may be formed in a semicircular shape to be gripped by the user.

The tool catching grooves 114 allow an end of the tool which moves into the filter pipe 110 to be caught, and the filter pipe 110 is drawn by the tool (not shown) pulled from the outside of the cooling fluid inlet 12 of the plate-type heat exchanger 10 to be separated from the cooling fluid inlet 12 to the outside.

Each of the tool catching grooves 114 may be formed in any one shape among a circular shape, a semicircular shape, an oval shape, and a polygonal shape.

The reinforcement members 120 may be closely fixed to the inner circumferential surface of the filter pipe 110 by a welding method to avoid the small-diameter holes 112.

The reinforcement members 120 support the inner circumferential surface of the filter pipe 110 to prevent deformation of the outer surface of the filter pipe 110 due to a pressure of the fluid flowing into the filter pipe 110 or a water hammering action applied to the outer surface of the filter pipe 110.

The reinforcement members 120 are connected to each other in a spiral shape along the inner circumferential surface of the filter pipe 110.

A plurality of reinforcement members 120 are intermittently provided to be formed in the spiral shape along the inner circumferential surface of the filter pipe 110 and coupled and connected to each other.

The plurality of reinforcement members 120 may be manufactured to have the same shape, and both ends of the reinforcement members 120 may be welded to be intermittently coupled and connected to each other.

The plurality of reinforcement members 120 are formed in ring shapes to be spaced a predetermined interval from each other in a longitudinal direction of the filter pipe 110 and fixed to the inner circumferential surface of the filter pipe 110 by the welding method.

A cross section of the reinforcement member 120 is formed in any one shape among a circular shape, a semicircular shape, an oval shape, and a polygonal shape.

The reinforcement member 120 may have the cross section formed in a quadrangular shape to be coupled to the inner circumferential surface of the filter pipe 110 by the welding method.

A stopper part 200 is fitted to the other end of the filtration filter 100 to seal the other end of the cooling fluid inlet 12.

The stopper part 200 prevents the fluid from leaking out of the plate-type heat exchanger 10 to the outside through the other end of the cooling fluid inlet 12.

The stopper part 200 is closely fixed to an outer wall of the plate-type heat exchanger 10 by a fastening member (unnumbered) to seal the other end of the cooling fluid inlet 12.

The plate-type heat exchanger inline filter according to the present invention provided as described above is used as follows.

First, the filtration filter 100 enters through the cooling fluid inlet 12 of the plate-type heat exchanger 10 so that one surface of the filtration filter 100 linearly communicates with the cooling fluid inlet 12 and the outer surface of the filtration filter 100 is positioned to face the heat transfer plates 11.

In this case, the filter pipe 110 of the filtration filter 100 enters through the cooling fluid inlet 12, in this state, a state in which the input hole 111 linearly communicates with the cooling fluid inlet 12 of the plate-type heat exchanger 10 is maintained, the outer surface of the filter pipe 110 is installed perpendicular with the cooling fluid inlet 12, and the small-diameter holes 112 are installed to face the heat transfer plates 11.

In addition, the stopper part 200 is fixedly fastened to an outer wall surface of the plate-type heat exchanger 10 corresponding to the other end of the filter pipe 110 of the filtration filter 100 using a fastening member (unnumbered) to seal the other end of the upper filter pipe, and thus the other end of the cooling fluid inlet 12 is sealed.

Then, when the fluid is supplied through the cooling fluid inlet 12 of the plate-type heat exchanger 10, the fluid flows toward the input hole 111 of the filter pipe 110 communicating with the cooling fluid inlet 12 of the plate-type heat exchanger 10, and in this case, the fluid flowing into the filter pipe 110 through the input hole 111 is pushed by a pressure of the fluid continuously supplied through the cooling fluid inlet 12 to pass through the small-diameter holes 112 toward the outer surface of the filter pipe 110.

In this case, the fluid flowing toward the input hole 111 is guided to be slid into the input hole 111 by the curved guide part 111*a* formed on an edge of the inner circumferential surface of the input hole 111, and accordingly, the fluid enters toward the input hole 111 and is supplied into the filter pipe 110.

In this case, the dust or foreign matter contained in the fluid passing through the small-diameter holes 112 in the filter pipe 110 is filtered by the inner circumferential surface of the filter pipe 110, and at the same time, the fluid passes through the small-diameter holes 112 and is discharged in a direction of the width of the channel between the heat transfer plates 11 of the plate-type heat exchanger 10 so that the dust or foreign matter contained in the fluid is filtered and the fluid is purified.

In this case, while the fluid flows into the filter pipe 110 and passes through the small-diameter holes 112, an expansion pressure is generated in the inner circumferential surface of the filter pipe 110, and in this case, the reinforcement members 120 formed on the inner circumferential surface of the filter pipe 110 support the inner circumferential surface of the filter pipe 110 to prevent deformation of the outer surface of the filter pipe 110.

In this case, the fluid discharged to the width of the channel between the heat transfer plates 11 through the small-diameter holes 112 vertically moves upward from a lower floor to an upper floor, a pressure of the fluid is about 15 bar, and thus the expansion pressure is generated on the inner circumferential surface of the filter pipe 110.

That is, as the fluid is continuously supplied into the filter pipe 110 through the cooling fluid inlet 12, the fluid passes through the small-diameter holes 112 to apply a pressure to the inner circumferential surface of the filter pipe 110, and in this case, the reinforcement members 120 support the inner circumferential surface of the filter pipe 110 to maintain a shape of the inner circumferential surface of the filter pipe 110 to prevent deformation of the filter pipe 110 due to the expansion pressure.

On the other hand, when the fluid supplied through the cooling fluid inlet 12 of the plate-type heat exchanger is stopped, the fluid free-falls through the width of the channel between the heat transfer plates 11 of the plate-type heat exchanger 10 while the fluid free-falls from the upper floor to the lower floor, a pressure is applied to the outer circumferential surface of the filter pipe 110 while the fluid flows into the filter pipe 110 through the small-diameter holes 112 of the filter pipe 110, and in this case, a contraction pressure is generated on the inner circumferential surface of the filter pipe 110 by the pressure of the fluid reversely flowing through the inlet 12.

Then, the reinforcement members 120 support the inner circumferential surface of the filter pipe 110 to prevent deformation of the filter pipe 110 due to the contraction pressure.

In this case, the plurality of reinforcement members 120 may each be formed in the ring shape on the inner circumferential surface of the filter pipe 110 to be spaced the predetermined interval from each other or may be intermittently formed to be coupled and connected to each other, and the plurality of reinforcement members 120 may be connected to each other by a welding method.

In addition, the reinforcement member 120 may have the cross section formed in the quadrangular shape to be fixedly coupled to the inner circumferential surface of the filter pipe 110 by a welding method.

Meanwhile, when the filtration filter 100 installed in the plate-type heat exchanger 10 is to be replaced or maintained, the stopper part 200 is separated from the outer wall surface of the plate-type heat exchanger, and in this state, when the handles 113 of the filter pipe 110 are gripped and pulled by a tensile force, the filter pipe 110 is moved backward in the cooling fluid inlet 12 and separated toward the other end of the cooling fluid inlet 12.

In addition, when the filter pipe 110 is fixedly fitted into the cooling fluid inlet 12 and it is difficult to separate the filter pipe 110 using a tensile force of an operator, the tool (not shown) is moved into the filter pipe 110, in a state in which an end of the tool (not shown) is caught in the tool catching groove 114, an external apparatus (for example, a tension machine) is operated to pull the filter pipe 110, then the filter pipe 110 is moved backward in the cooling fluid inlet 12, and the filter pipe 110 may be separated from the inside of the cooling fluid inlet 12.

In this case, the tool catching groove 114 of the filter pipe 110 may be installed toward a bottom surface of the cooling fluid inlet 12 to prevent the tool catching groove 114 from affecting on the discharge of the fluid through the small-diameter holes 112 and through the width of the channel between the heat transfer plates 11.

In the structure in which the reinforcement members 120 are closely fixed into the filter pipe 110 of the filtration filter 100 as describe above, and the reinforcement members 120 support the inner circumferential surface of the filter pipe 110 to prevent deformation of the outer surface of the filter pipe 110 due to a pressure of the fluid, as the reinforcement members 120 are installed along the inner circumferential surface of the filter pipe 110 of the filtration filter 100, a shape of the outer surface of the filter pipe 110 is maintained without changing, the reinforcement members 120 firmly support the inner circumferential surface of the filter pipe 110 to prevent the outer surface of the filter pipe 110 from expanding or contracting due to the pressure of the fluid flowing in the filter pipe 110, and since the diameter of each of the small-diameter holes 112 of the filter pipe 110 is not changed because the deformation of the outer surface of the filter pipe 110 is prevented, the filter pipe 110 can be easily separated from the inside of the cooling fluid inlet 12 because the expansion of the filter pipe 110 of the filtration filter 100 is prevented. Accordingly, there are advantages that the maintenance is convenient, and the reliability of a product is also improved.

The above-described plate-type heat exchanger inline filter according to the present invention is not limited to the above-described embodiments, and the spirit of the invention ranges to a scope in which those skilled in the art may variously change without departing from the gist of the present invention claimed by the appended claims.

The invention claimed is:

1. A plate-type heat exchanger inline filter comprising:
   a filtration filter (100) which is inserted into a cooling fluid inlet (12) of a plate-type heat exchanger (10) formed by a plurality of heat transfer plates (11) that are stacked and coupled, receives a fluid through one end thereof communicating with the cooling fluid inlet (12), and filters dust or foreign matter contained in the fluid while the fluid passes through an outer surface thereof to be supplied between the heat transfer plates (11); and
   a stopper part (200) fitted to the other end of the filtration filter (100) to seal the other end of the cooling fluid inlet (12),
   wherein:
   the filtration filter (100) includes a filter pipe (110) which has a hollow shape and in which an input hole (111) communicating with the cooling fluid inlet (12) is formed in the one end thereof and a plurality of small-diameter holes (112) are formed through an outer surface thereof to allow the fluid to pass therethrough in a direction perpendicular to the cooling fluid inlet (12) toward a gap between the heat transfer plates (11) and a reinforcement member (120) closely fixed along an inner circumferential surface of the filter pipe (110) to support the inner circumferential surface of the filter pipe (110);
   a curved guide part (111a) formed at an end part of the filter pipe (110) and curved from an outer edge of the input hole (111) toward the inner circumferential surface of the filter pipe (110) such that a diameter of the outer edge of the input hole (111) is greater than that of an inner side of the input hole (111), wherein the curved guide part (111a) is configured to smoothly guide the fluid being introduced therethrough into the filter pipe (110);
   a diameter of the small-diameter hole (112) of the filter pipe (110) is proportional to a width of a channel between the heat transfer plates (11) of the plate-type heat exchanger (10) or is relatively smaller than the width of the channel between the heat transfer plates (11), and the fluid is supplied between the heat transfer plates (11);
   the reinforcement member (120) is formed in a spiral spring shape such that a first end of the reinforcement member (120) extends to the input hole (111) and a second end of the reinforcement member (120) extends to the stopper part (200), and fixed to the inner circumferential surface of the filter pipe (110) by a welding method;
   a cross section of the reinforcement member (120) is formed in any one shape among a circular shape, a semicircular shape, an oval shape, and a polygonal shape;
   a pair of handles (113) are symmetrically formed on the inner circumferential surface of the other end of the filter pipe (110); and
   tool catching grooves (114) formed in an outer circumferential surface of the filter pipe (110) with a predetermined interval along a longitudinal direction of the filter pipe (110), such that the tool catching grooves are configured to catch an end of a tool when the tool pulls the filter pipe to separate from the cooling fluid inlet.

2. The plate-type heat exchanger inline filter of claim 1, wherein:
   the filtration filter (100) is formed of an aluminum material;
   the inner and outer circumferential surfaces of the filtration filter (100) are surface-treated by an anodizing method and a sealing method, or the inner and outer circumferential surfaces are surface-treated by an anodizing method and a sealing method, and then anti-scale coating is performed thereon; and
   the filtration filter (100) induces the dust or foreign matter to slide to prevent the dust or foreign matter from being adsorbed on the inner circumferential surface of the filtration filter (100).

3. The plate-type heat exchanger inline filter of claim 2, wherein the anodizing method of performing a surface treatment on the filtration filter (100) includes one of:
   a sulfuric acid method;
   an oxalic acid method;
   a phosphoric acid method; and
   a chromic acid method.

4. The plate-type heat exchanger inline filter of claim 3, wherein, through the sulfuric acid method of performing a surface treatment on the filtration filter (100), a phosphorus oxide film is formed to perform a surface treatment on the inner and outer circumferential surfaces of the filtration filter.

5. The plate-type heat exchanger inline filter of claim 2, wherein the sealing method of performing a surface treatment on the filtration filter (100) includes one of:
   a hydration sealing method;
   a metal-salt sealing method; and
   an organic sealing method.

6. The plate-type heat exchanger inline filter of claim 5, wherein the hydration sealing method or metal-salt sealing method of performing a surface treatment on the filtration filter (100) is performed using a surfactant to provide a hydrophobic property to perform a surface treatment on the inner and outer circumferential surfaces of the filtration filter.

7. The plate-type heat exchanger inline filter of claim 2, wherein:
   the anti-scale coating performed on the filtration filter (100) is performed with a mixture containing silicone resin and sodium lauryl sulfate; and
   the mixture is sprayed on the inner and outer circumferential surfaces of the filtration filter in a spray manner.

* * * * *